Sept. 20, 1955  L. STEINMETZ  2,718,004
FASTENER APPLYING MACHINE
Filed Sept. 21, 1953  9 Sheets-Sheet 7
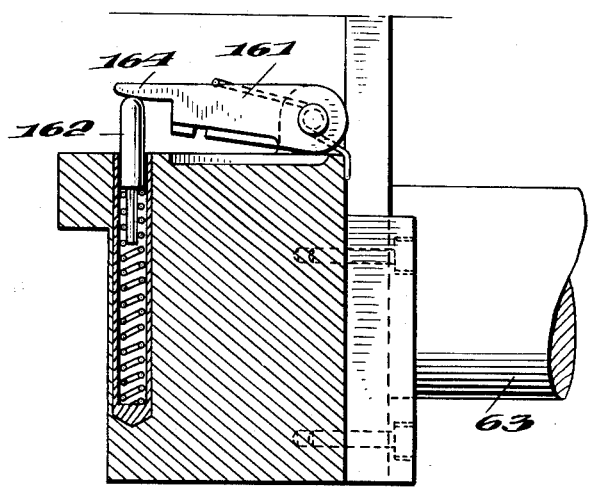
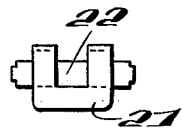
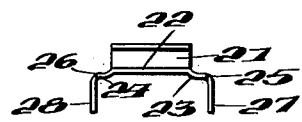
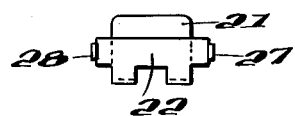
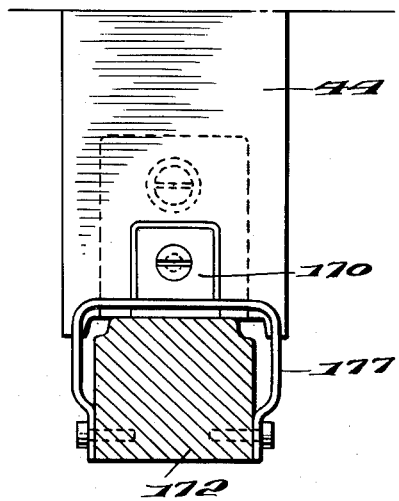
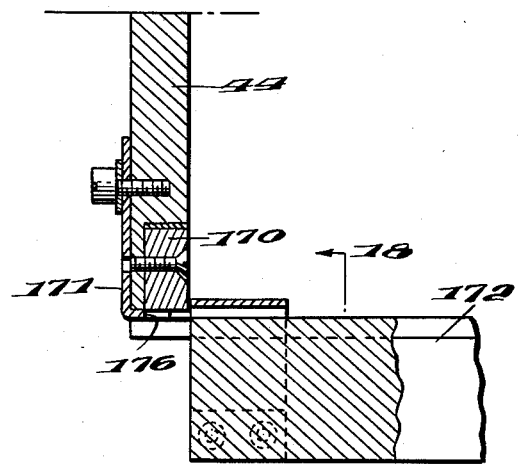
INVENTOR
LAWRENCE STEINMETZ,
BY  Dos T. Hatfield
ATTORNEY Sept. 20, 1955  L. STEINMETZ  2,718,004
FASTENER APPLYING MACHINE
Filed Sept. 21, 1953  9 Sheets-Sheet 8
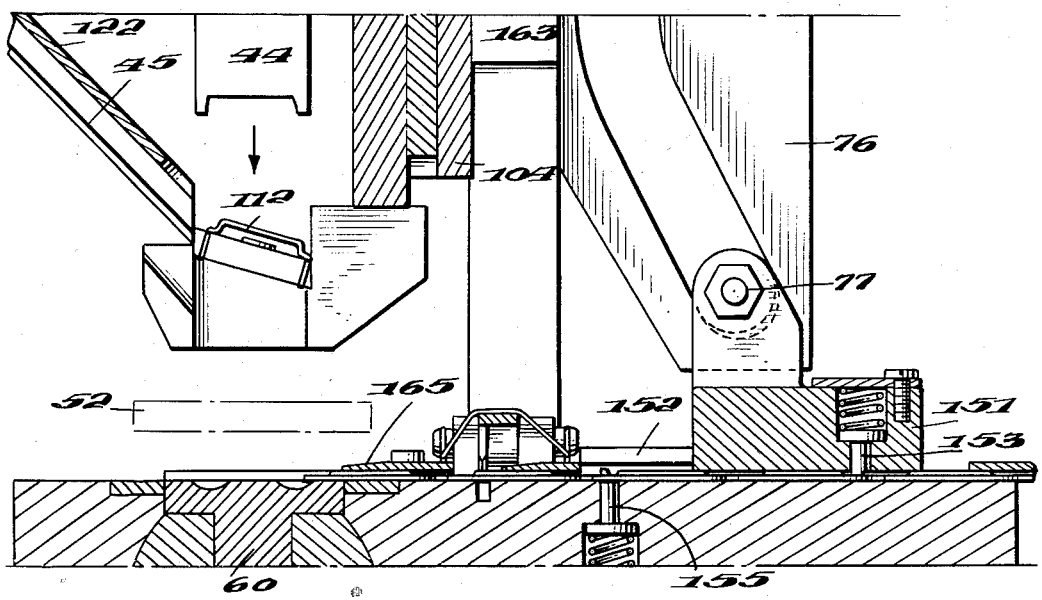
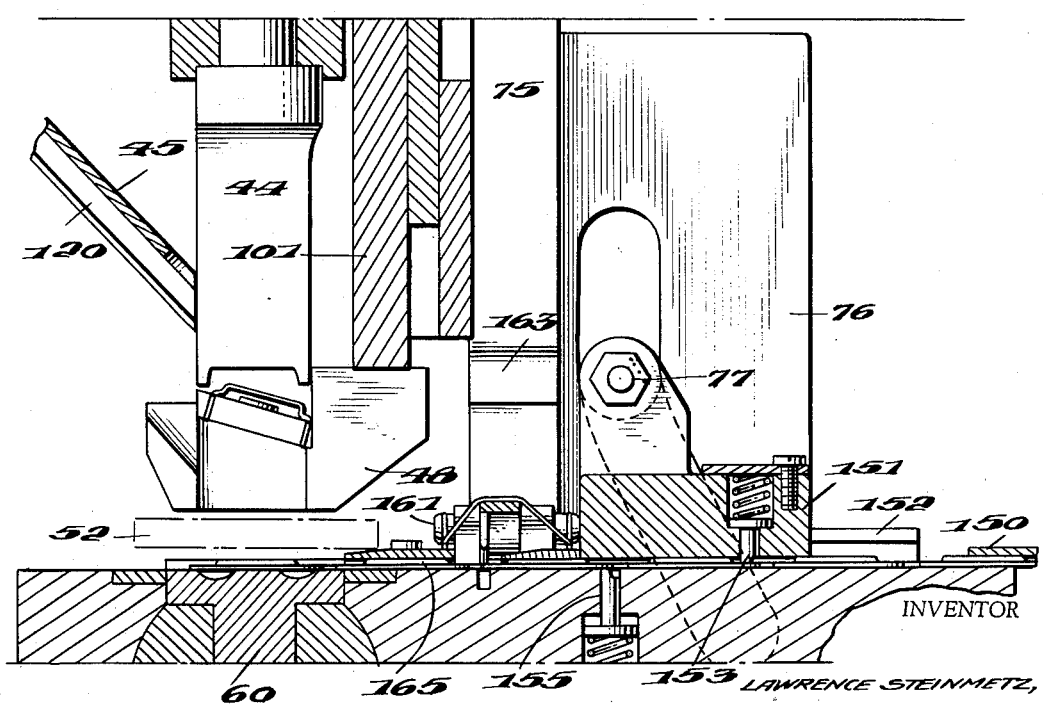
INVENTOR
LAWRENCE STEINMETZ,
BY
ATTORNEY Sept. 20, 1955  L. STEINMETZ  2,718,004
FASTENER APPLYING MACHINE
Filed Sept. 21, 1953  9 Sheets-Sheet 9
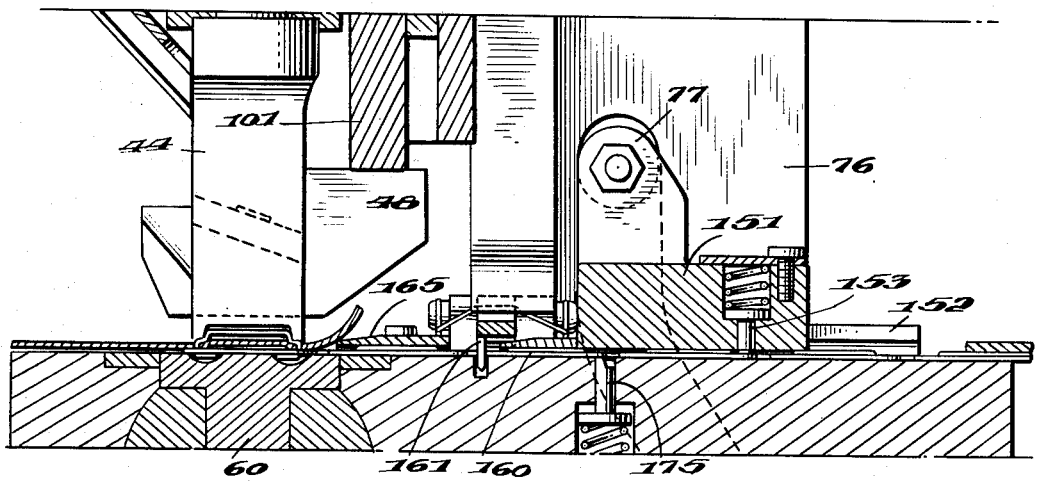
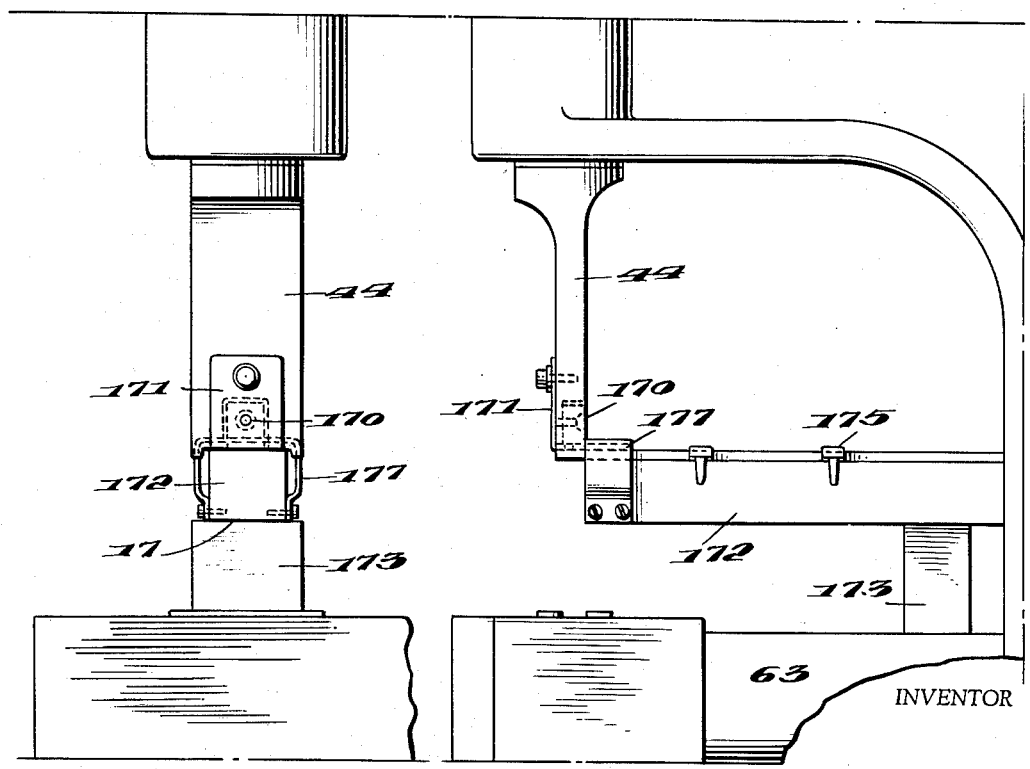
INVENTOR
LAWRENCE STEINMETZ,
BY Roe T. Hatfield
ATTORNEY

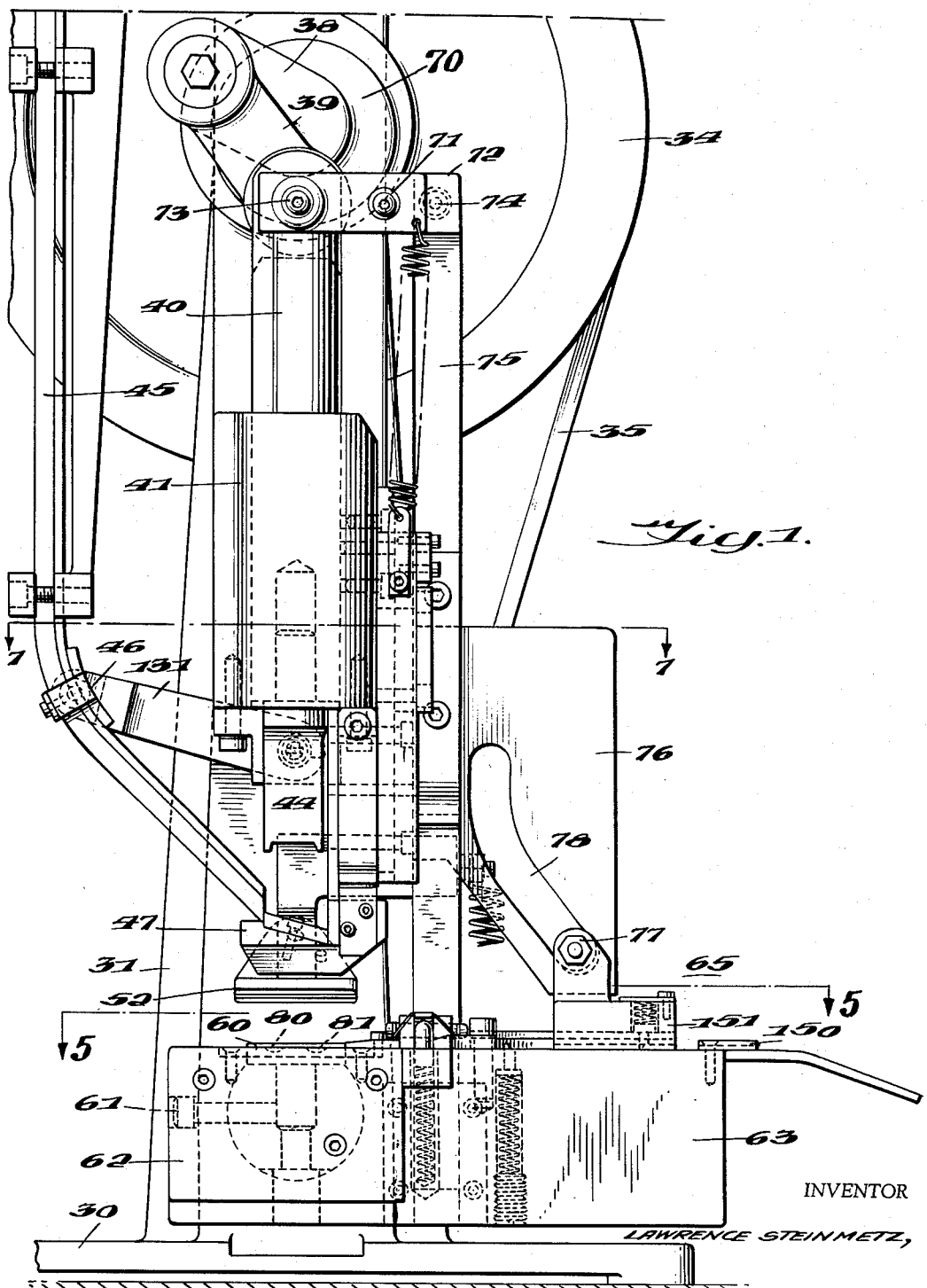

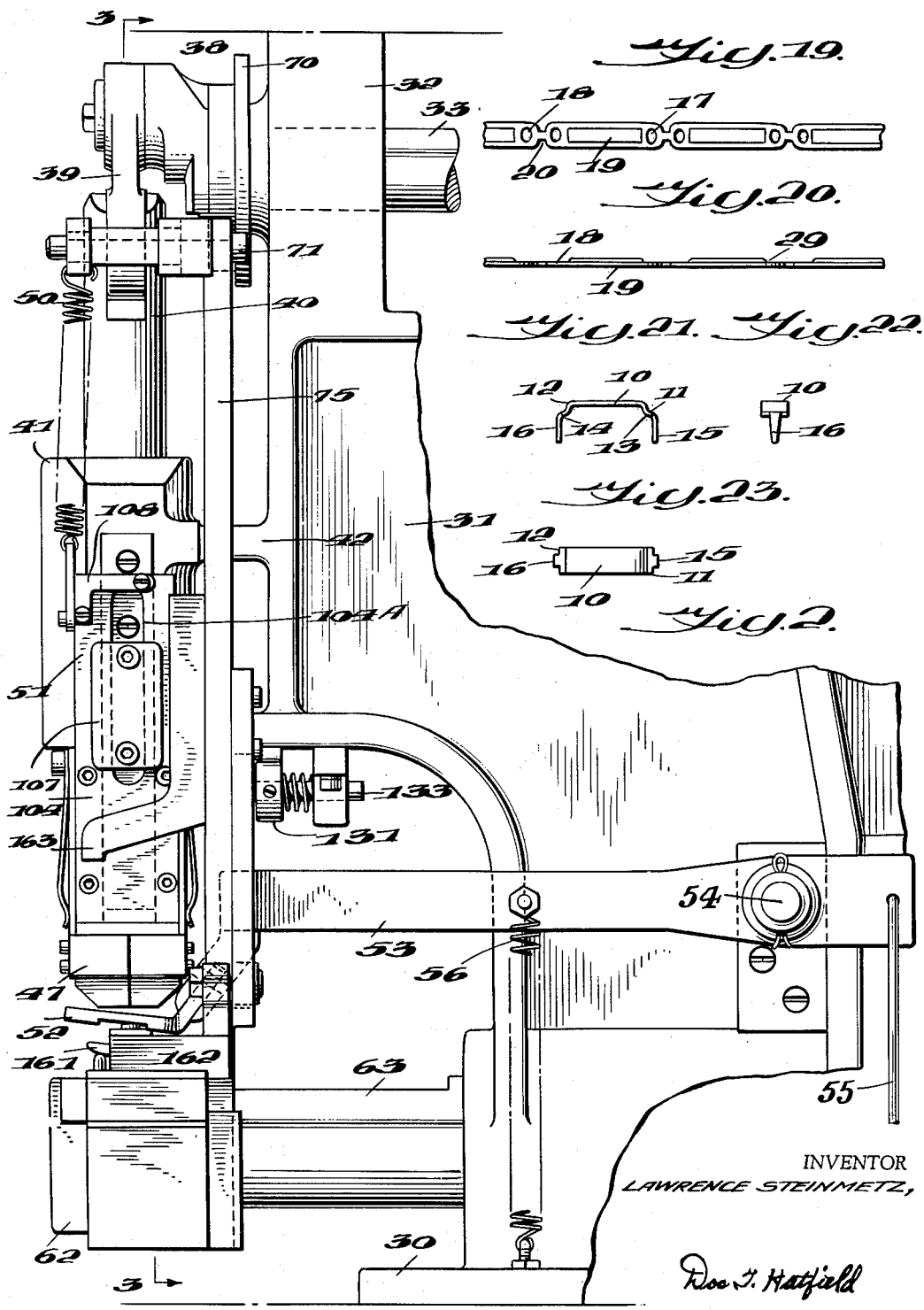

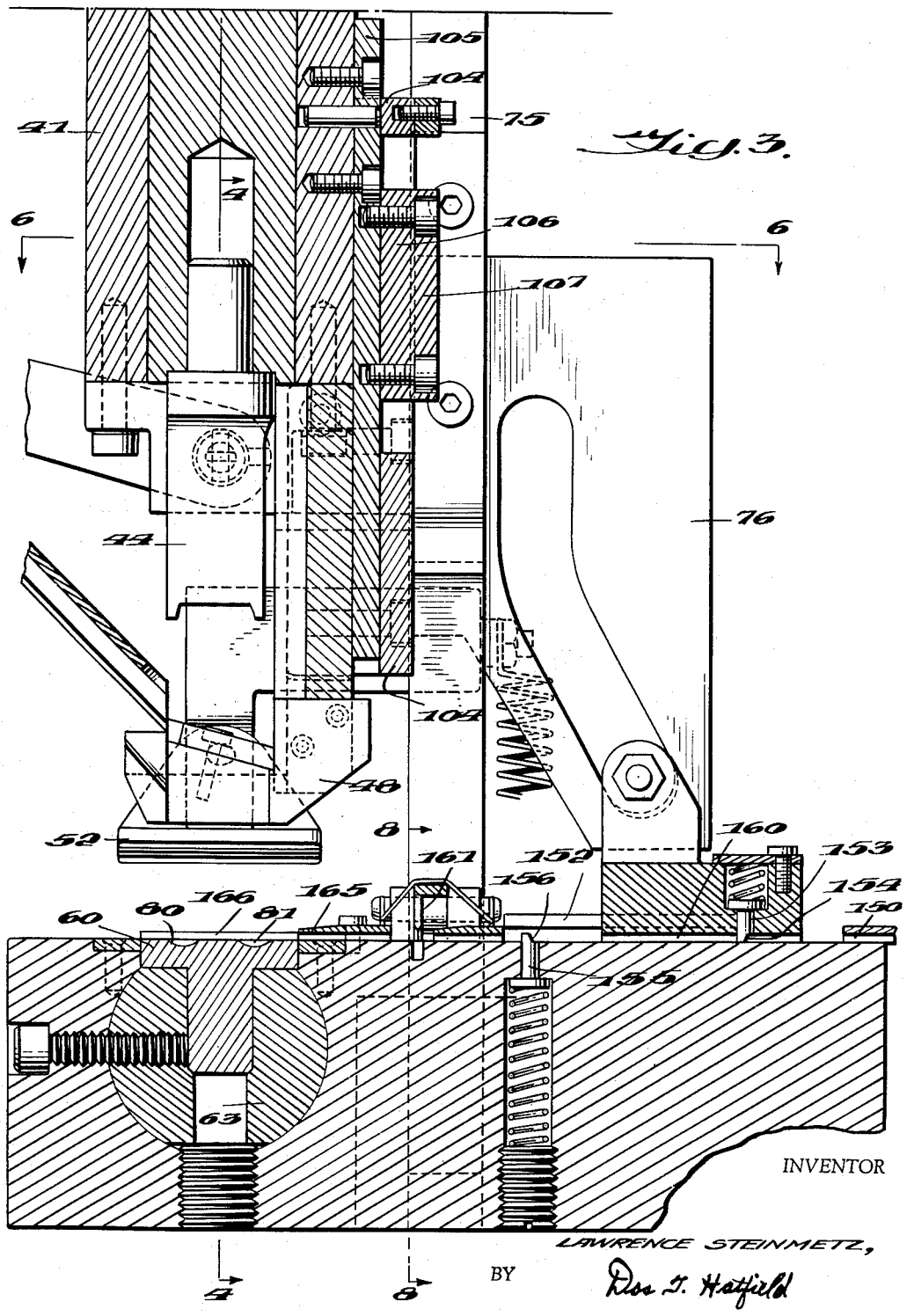

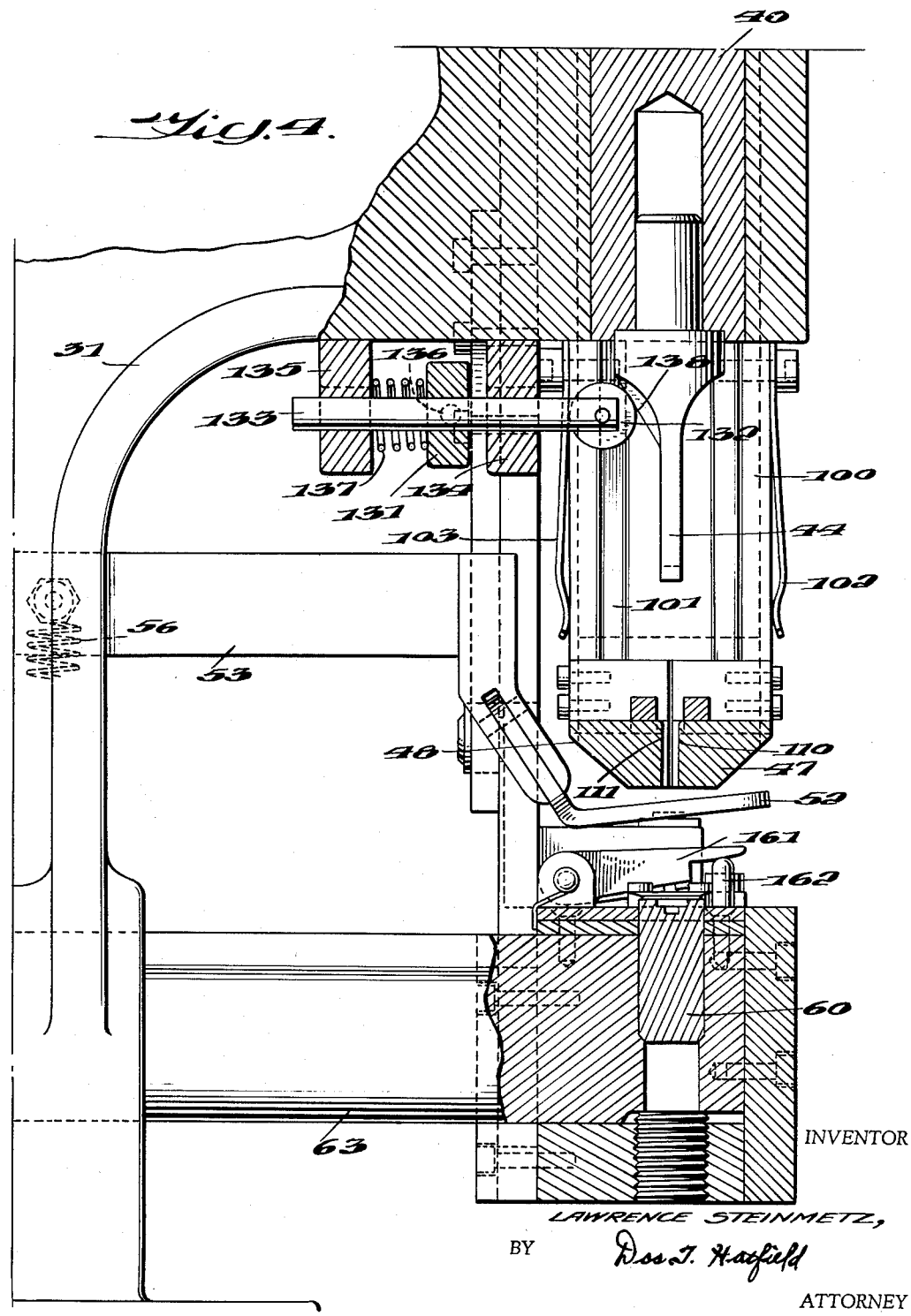

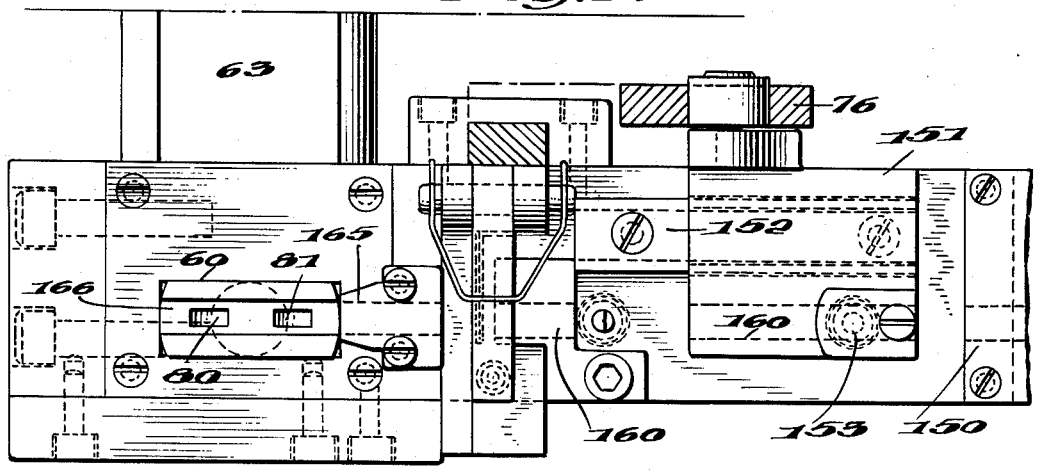
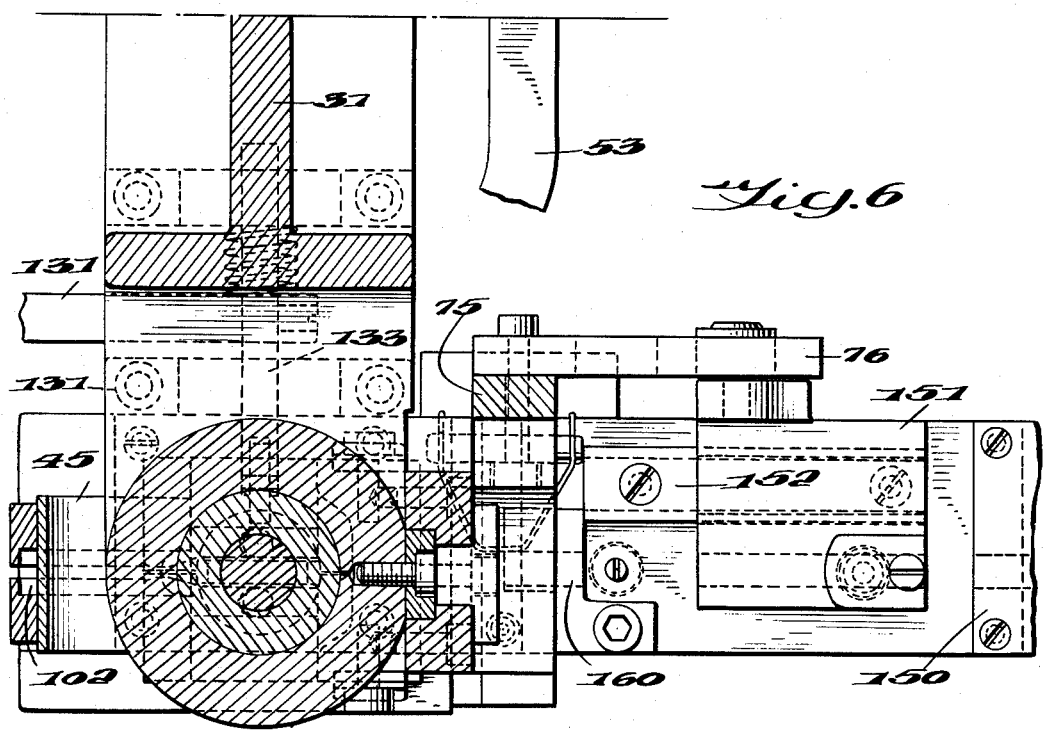

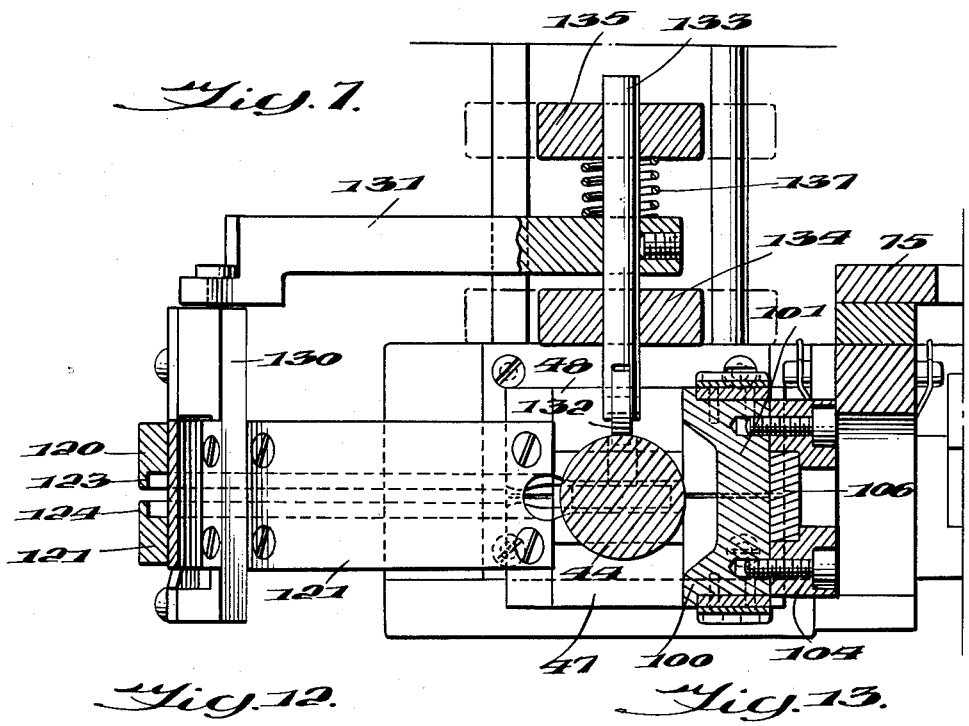
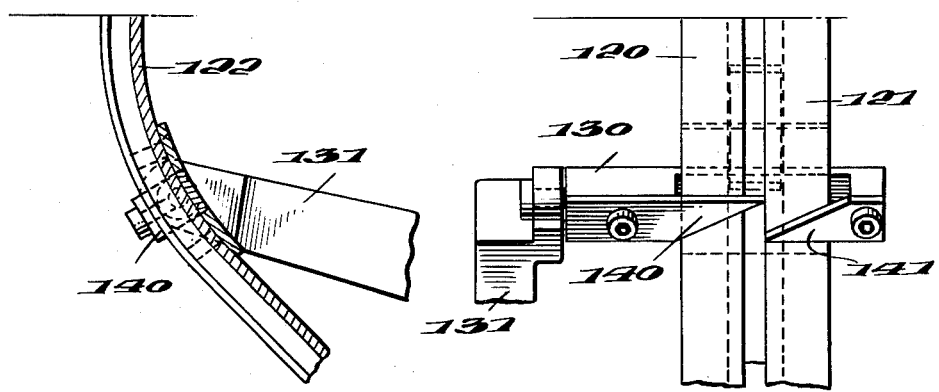
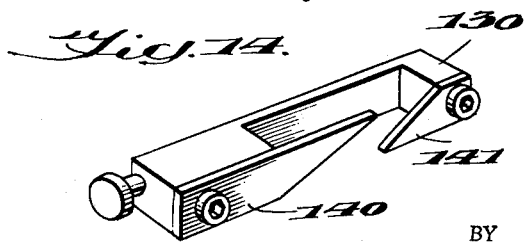

United States Patent Office 2,718,004
Patented Sept. 20, 1955

2,718,004

FASTENER APPLYING MACHINE

Lawrence Steinmetz, Brooklyn, N. Y.

Application September 21, 1953, Serial No. 381,165

10 Claims. (Cl. 1—3)

The present invention relates generally to riveting machines, and more particularly to a machine for automatically securing garment fastener hooks or eyes to suitable rivet washer plates with the garment fabric clinched therebetween.

Hooks and eyes that are preformed of sheet metal are now being used as garment fasteners in place of the more conventional button and buttonhole. For example, such hooks and eyes are particularly advantageously used as the fastener for the waistbands of men's trousers. Prior to this invention, the hooks and eyes and their associated rivet plates were secured to the garment fabric by a hand-clinching or riveting operation which was laborious, time consuming, and therefore expensive.

It is a principal object of the present invention to provide a machine for automatically clinching or riveting the hook or eye and associated rivet plate to the garment fabric in a single powered operation.

Another object of the invention is to provide a simple and efficient power operated machine that will apply and secure a hook or eye to a garment fabric without requiring any manual handling operations other than to position the fabric on the machine and to manipulate a foot or hand control lever.

Yet another object of the invention is to provide a power operated machine for automatically feeding, positioning and clinching hooks or eyes and their associated rivet plates in timed relation to each other in a manner to secure the hook or eye to a garment fabric positioned to receive the same.

A feature of the invention is the provision of a power operated machine having a reciprocating plunger for riveting a hook or eye to a suitably positioned garment fabric and through the apertures of a similarly positioned rivet plate on the opposite side of the garment fabric. In this connection a reciprocable guide that is movable with the plunger for part of its travel may be provided to accurately position the hook or eye in its movement towards the garment fabric to assure the proper registration of the rivet prongs of the hook or eye with the apertures of the rivet plate.

Another feature of the invention is the provision of feeding means to feed a single hook or eye from a quantity of hooks or eyes into position for movement by the aforesaid plunger during each cycle of operation of the machine.

Still another feature of the invention is the provision of feeding means for positioning a single rivet plate from a continuous source of rivet plates into an exact position beneath the garment fabric in correct alignment and timing with relation to the movement of the aforesaid plunger for receiving the rivet prongs of the hook or eye to be secured to the garment.

Yet another feature of the invention is the provision of a single rotatable power shaft and associated crank, cam and lever mechanism for actuating the aforesaid plunger, hook or eye feeding mechanism, and rivet plate feeding mechanism in timed relation to each other whereby a single rotation of the power shaft is effective to secure a hook or eye and associated rivet plate to a garment fabric.

Yet another feature of the invention enabling the use of a continuous strip of preformed rivet plate members is the provision of strip feeding and cutting mechanisms associated with the rivet plate feeding arrangement whereby the rivet plate strip is advanced to sever the foremost rivet plate of the strip at the same time that a previously severed rivet plate member is advanced into riveting position beneath the fabric and plunger.

A modified form of the invention for use with fastener elements of magnetic material provides for the manual positioning of a hook or eye fastener element into operative position beneath the reciprocating plunger and features a suitably configured slide for supporting a plurality of such members in proximity to the end of the plunger, together with a magnetic insert on the end of the plunger for holding and guiding a single hook or eye during the movement towards and through the fabric and apertures of the rivet plate.

Another feature of the invention as used with all embodiments thereof is the provision of an anvil member having suitably configured indentations over which the rivet plate and garment fabric are positioned, the indentations of the anvil being arranged to upset or clinch the rivet prongs of the hook or eye against the rivet plate as the reciprocating plunger reaches the bottom of its stroke. In this connection, a presser foot is arranged to engage the upper surface of the garment to thereby hold the garment in close juxtaposition to the upper surface of the rivet plate and anvil. The presser foot may be connected to operate with control lever of the machine in order to raise the foot when a garment is to be placed on or removed from the machine at times when the reciprocating plunger is near the top of its stroke.

Further objects, features and the attending advantages of the invention will be apparent with reference to the following specification and drawings in which:

Fig. 1 is an end elevation of the riveting machine as seen from the riveting end;

Fig. 2 is a front elevation of the riveting machine;

Fig. 3 is a longitudinal section on the line 3—3 of Fig. 2;

Fig. 4 is an enlarged fragmentary longitudinal section on line 4—4 of Fig. 3;

Fig. 5 is a cross-section on the line 5—5 of Fig. 1;

Fig. 6 is a cross-section on the line 6—6 of Fig. 3;

Fig. 7 is a cross-section on the line 7—7 of Fig. 1;

Fig. 8 is a cross-section on the line 8—8 of Fig. 3 to show details of the rivet plate strip cutting mechanism;

Figs. 9, 10, 11 are enlarged fragmentary longitudinal sections similar to Fig. 3, but showing the plunger and fastener guide in three respectively different successive operating positions assumed in riveting the fastener to a garment fabric;

Figs. 12, 13 and 14 are detail views of the escapement mechanism used in the preferred form of the invention for feeding a single hook or eye fastener element in response to a single reciprocation of the plunger;

Fig. 15 is a fragmentary end view of a modified form of plunger having a magnetic element for holding and guiding the hook or eye fasteners as used in a modification of the invention;

Fig. 16 is a side view similar to Fig. 15;

Fig. 17 is an enlarged section on the line 17—17 of Fig. 15;

Fig. 18 is a section on the line 18—18 of Fig. 17;

Fig. 19 is a plan view of a strip of rivet plates of the type to be fed to the machine of the invention;

Fig. 20 is a side elevation of the strip of rivet plates shown in Fig. 19;

Figs. 21, 22 and 23 are side, end and plan views respectively of an eye fastener element that may be riveted to a garment fabric by the machine of the invention; and Figs. 24, 25 and 26 are top, end and bottom views, respectively, of a hook fastener element, that may be riveted to a fabric by the machine of the invention.

Referring first to Figs. 19–23 of the drawings, the riveting machine of the invention is adapted to secure, by a riveting or clinching operation, a fastener eye formed of sheet metal and having the eye body portion 10, with depending shoulder portions 11 and 12 forming flanges 13 and 14 which are to rest on one surface of a garment fabric. Depending rivet prong members 15 and 16 are adapted to penetrate the garment fabric and pass through suitable apertures 17 and 18 of a rivet plate member 19 that is positioned against the other surface of the garment fabric. As particularly shown by Figs. 19 and 20, a plurality of rivet plate members such as shown at 19 are formed in a strip joined by the strip portions such as shown at 20 and the machine of the invention is adapted to sever a rivet plate from the strip at the portion 20 prior to feeding the severed rivet plate into riveting position.

Figures 24–26 of the drawings are detailed views of a hook fastener element having a bifurcated hook body 21 curved upwardly and over the base portion 22. The machine of the invention may also be used to apply the hook fastener element to a garment. The base portion 22 is provided with depending shoulder portions 23 and 24 forming flanges 25 and 26 which are to rest on one surface of the garment. Depending rivet prong members 27 and 28 are adapted to penetrate the garment fabric and pass through suitable apertures 17 and 18 of the rivet plate member 19, shown by Fig. 19, that is positioned against the other surface of the garment.

When applying either the hook fastener of Figs. 24–26 or the eye fastener of Figs. 21–23 to a garment fabric, the same form of rivet plate member 19 is used and either the rivet prong members 15, 16 or 27, 28 are clinched over against the rivet plate 19 to secure the assembly. It will be noted as shown by Figs. 19 and 20 that the rivet plate 19 is provided with an indented portion 29 into which the rivet prong members may be conformed thus making the riveted assembly with a garment fabric less bulky.

*General arrangement and operation of the riveting machine*

Referring to the drawings, and most particularly to Figs. 1 and 2, the machine is provided with a base casting 30 which may be supported on a table or the like. The base casting 30 is extended upward at 31 to form journal supports such as shown at 32 for a rotatable shaft 33 adapted to be driven by the pulley 34 and belt 35 from any suitable source of power such as an electric motor (not shown). A conventional form of one revolution clutch (not shown) is interposed in the driving connections between the pulley 34 and shaft 33 and is arranged to be controlled by a foot or hand lever (also not shown) to operate the machine by rotating the shaft 33 one complete revolution for each cycle of the riveting machine operation.

The end of the shaft 33, that is opposite the end on which the pulley 34 is journalled, is provided with a bell crank 38 pivotally connected by a link 39 to the upper end of a plunger 40. The plunger 40 is slidably secured in a journal 41 integrally formed with the main frame 31 by means of the casting webs 42. The timing of the one revolution clutch with respect to the pulley 34 and shaft 33 is preferably such that the plunger 40 is at the top of its stroke at the beginning and end of each cycle of machine operation for each revolution of the shaft 33 as controlled by the one revolution clutch.

The lower end of the plunger 40 is provided with a fastener engaging end generally shown at 44 and to be later described in detail. Fastener elements are fed one at a time for each cycle of machine operation from the storage chute 45 by means of the escapement mechanism generally shown at 46. Each fastener element as fed by the escapement mechanism 46 is received between the spring pressed jaws generally shown at 47, 48 to be held beneath the plunger end 44. The spring pressed jaws are adapted to be carried downward against the tension of coil spring 50 secured to the upper end of a slide generally shown at 51 to which the jaws 47 and 48 are secured, as will be later described in detail.

A presser foot 52 is carried on the end of a lever arm 53 pivoted at 54 and normally held in the raised position shown by Figs. 1 and 2, since the control rod 55 is connected with the hand or foot operating control in a manner to maintain such position until the one revolution clutch is engaged. When the clutch is engaged, the rod 55 is moved upwardly to allow the spring 56 to move the presser foot 52 downwardly against the garment fabric that has been manually positioned on the anvil 60.

The anvil 60 is removably secured by means of the set screw 61 in a base portion 62 integrally connected with the main frame 31 by means of the extension 63. The base portion 62 is also extended to support the rivet plate feeding mechanism generally shown at 65. The rivet plate feeding mechanism, as will be later described in detail, is operated in timed relation to the movement of the plunger 40 in a manner to sever a rivet plate from the strip of rivet plates and position a severed rivet plate on the anvil 60 beneath the garment fabric to receive the rivet prongs of the hook or eye fastener. To obtain the properly correlated operation of the rivet plate feeding mechanism 65, a roller 70, concentric with shaft 33, engaging a follower 71 on a lever arm 72 pivotally connected to the plunger at 73 and by the pivotal connection 74 to a lever arm 75 is provided. In such manner the lever arm 75 is reciprocated to reciprocate the cam plate 76 and therefore reciprocate the rivet plate feeding mechanism 65 by means of the cam follower 77 engaging the cam slot 78 of the cam plate 76.

The various mechanisms which have been generally and briefly described above are operated together as follows in a single cycle of operation of the machine. Assuming that a garment fabric has been placed on the anvil 60 in a position to receive a fastener hook or eye, the machine operator manipulates the hand or foot lever to engage the one revolution clutch and at the same time the presser foot 52 is lowered to hold the garment fabric in position on the anvil. As the plunger 40 with the fastener engaging end 44 moves downward, a fastener previously received between the spring pressed jaws 47, 48 is engaged. At the same time, the cam plate 76 is moved downward to cause the rivet plate feeding mechanism to advance the rivet plate strip to a severing position and also advance a previously severed rivet plate to a riveting position over the anvil 60 and beneath the garment fabric. As the plunger end 44 engages the fastener element in its downward movement, it also engages the spring pressed jaws 47, 48 which, due to the relative tensions of the jaws and the jaw slide spring 50, carries the entire assembly against the tension of the spring 50 downwards to the upper surface of the presser foot 52. When the jaws 47, 48 engage the upper surface of the presser foot 52, the fastener engaging plunger end 44 continues to the bottom of its stroke to move the fastener element downward between the spring jaws 47, 48 and cause the rivet prong projections to penetrate the fabric and the apertures of the rivet plate. The anvil 60 is provided with suitable indentations 80 and 81 which are effective to upset the rivet prongs and clinch them against the underside of the rivet plate, thus completing the riveting of the fastener to the garment fabric.

At the time that the plunger 40 nears the bottom of its stroke, the just advanced strip of rivet plates is in a position to sever the foremost rivet plate of the strip and suitable severing mechanism is then operated, as will be later described in detail. As the plunger returns to the top of its stroke, the escapement mechanism 46 becomes operative to allow a single fastener in the chute 45 to be fed by gravity into position between the spring pressed jaws 47, 48 for a subsequent riveting operation. At the top of the stroke of the plunger 40, the one revolution clutch completes a cycle of operation and the presser foot 52 is raised and the plunger 40 brought to rest.

*Detailed description of the fastener guiding slide*

Referring more patricularly to Figs. 2, 3, 4, 9, 10 and 11 of the drawings, the spring pressed jaws 47, 48 are secured to depending resilient supports 100, 101 having additional leaf springs 102, 103 to provide the necessary tension for the jaws all as most clearly shown by Fig. 4 of the drawings. The supports 100, 101 are fastened to a slide plate 104 (more clearly shown by Fig. 2) which is slidably mounted on a plate member 105 (see Fig. 3) secured to the side of the frame journal 41. The slide plate 104 is guided in its sliding movement by cross head slide 106, (Fig. 3) fixed to the plate member 105 and engaging the slot 104A of the slide plate 104. A cap plate 107 (Figs. 2 and 3) is secured to the cross head slide 106 to retain the entire assembly of the slide plate 104. The spring 50 is secured to the upper end of the slide plate 104 by means of the bracket 108 as shown by Fig. 2 of the drawings.

As shown by Figs. 4 and 9, the spring pressed jaws 47, 48 are provided with suitably shaped surfaces as shown at 110 and 111 to receive a fastener element 112, from the fastener feeding chute 45 in a position with the rivet prongs projecting downward between the jaw surface 110, 111. The fastener engaging end 44 of the plunger is shaped as shown to pass between the jaw surfaces 110, 111 when the jaws have been carried downward onto the presser foot 52 to the position shown by Fig. 11 of the drawings, to thus carry the fastener 112 therewith as shown by Figs. 9–11 of the drawings and complete the riveting operation. As the plunger 40 rises again to the top of its stroke, the spring 50 returns the slide plate 104 and jaws 47, 48 to the upper position shown by Fig. 3, ready to receive another fastener from the chute 45.

*Detailed description of the fastener feeding escapement*

Referring now to Figs. 1, 4, 7 and 12–13 of the drawings, a fastener chute 45 is mounted in a generally vertical position. The chute 45 is comprised of a pair of slotted guide rails 120, 121 secured to a backing plate 122. A plurality of fastener elements are retained in the space between the backing plate and guide rails 120, 121 along the vertical portion of the chute 45 with the rivet prongs projecting through the slot formed by the side walls 123, 124 of the guide rails 120, 121.

At the base of the vertical portion of the chute 45 is positioned the escapement mechanism shown in detail by Figs. 4, 7 and 12–14 of the drawings. The escapement member 130 is adapted to be reciprocated across the chute 45 as the lever arm 131 is reciprocated in response to downward and upward movement of the plunger end 44. A cam roller 132 is pivotally supported on one end of the push rod 133 which is journalled at 134 and 135 to the main frame 31. The lever arm 131 is fastened at 136 to the push rod 133, and a coil spring 137 normally urges the push rod 133 and cam roller 132 against the cam surface 138 of the plunger end 44.

As the plunger end 44 begins its downward stroke at the beginning of a cycle of machine operation, the push rod 133 is moved in the direction to the left of the drawing (Fig. 4), to move the lever arm 131 and escapement member 130 in the direction to the left of the drawing (Fig. 13). The upper escapement point 140 is thus removed from a position overlying the slot between the guide rails 120 and 121 to disengage the lower rivet prong 142 of the fastener eye 143, and permit such fastener eye to fall by gravity until the rivet prong 142 engages the lower escapement point 141 which is at that time in a position overlying the chute slot. The distance between escapement points 140 and 141 is slightly greater than the distance between the rivet prongs 142 and 144. Now, when the plunger end 44 returns to the top of its stroke, the push rod 133, lever arm 131 and escapement member 130 return to the positions shown in Figs. 4 and 13 of the drawings, thereby disengaging the rivet prong 142 with the lower escapement point 141 and allowing the fastener eye 143 to fall by gravity within the lower angled portion of the chute 45 to the spring pressed jaws 47, 48. At the same time, the upper escapement point engages the lower rivet prong 145 of the next lowermost fastener eye 146 to prevent it from being fed down the chute. It should be understood that the configuration of the chute guide rails 120, 121 and the spacing of the escapement points 140, 141 may be suitably correlated to the feeding of either fastener hooks or eyes.

*Detailed description of rivet plate feeding and severing mechanism*

A detailed description of the rivet plate feeding mechanism generally shown at 65 by Fig. 1 will now be made in connection with Figs. 3–11 of the drawings. A strip of rivet plate members (see Fig. 19) is positioned in the slot 150 fastened to the base member extension 63. A feeder block 151 is slidably positioned on the guide rail 152 and supports a spring pressed plunger 153 adapted to engage an aperture 17 of each rivet plate (see Figs. 19 and 20) when the feeder block moves in the direction to the left of the drawing. It will be noted that the plunger 153 is provided with the angled surface 154 allowing the plunger to disengage the aperture of the rivet plate when the feeder block moves in the direction to the right of the drawings. The feeder block is reciprocated by means of the cam plate 76 and associated mechanisms previously described. As the cam plate 76 reaches the bottom of its stroke, the spring pressed plunger 155, mounted in the frame 63, engages the aperture 18 of the just advanced rivet plate. It will be noted that the plunger 155 is provided with the angled surface 156, permitting disengagement to move rivet plates in the direction to the left of the drawings but engaging the rivet plate apertures and preventing movement of rivet plates in the direction to the right of the drawings.

As described above, the strip of rivet plates is advanced in the guiding grooves 150 and 160 to a position with the strip portion 20 (Fig. 19) beneath the cutter blade 161. The cutter blade 161 is normally held upward by the spring pressed plunger 162 (see Fig. 8) and when the lever arm 75 reaches the bottom of its stroke, a projection 163 carried thereby engages the upper end 164 of the cutter blade 161 to force it downwards and sever the foremost rivet plate from the just advanced strip of rivet plates. The advancing of the strip of rivet plates to the cutting position forces a previously severed rivet plate to advance through the slot 165 to the riveting position within the slot 166 of the anvil beneath the presser foot 52 and any garment fabric that may be overlying the anvil.

*Modified form of the invention*

In a modified form of the invention, the escapement mechanism for feeding fastener elements into position beneath the plunger end 44 and the spring pressed guiding jaws 47, 48 are not used. Instead, there are provisions to feed the fastener hooks or eyes by hand. Referring to Figs. 15–18 of the drawings, it will be seen that the plunger end 44 is provided with a magnetic insert 170. A stop plate 171 is also secured to the plunger end 44 for purposes to be later described. A storage slide rail 172 is mounted at 173 to the base frame of the machine and is adapted to slidably support a plurality of fastener elements such as the eyes shown at 175.

When the plunger end 44 is at the top of its stroke before the beginning of a cycle of operation, the machine operator manually advances the fastener elements such as shown at 175 in the direction to the left of the drawing to position a fastener eye element against the stop plate end surface 176 and beneath the magnet 170. It is assumed that the fastener eye 174 is formed of magnetic material so that it will be held by the magnetic attraction of the magnet 170 in the riveting position and guided thereby during the downward movement of the plunger. A guide channel member 177 is secured to the end of the slide rail 172, and the dimensions of the stop plate 171 and magnet 170 are such that only one fastener element may be carried by the plunger end during a cycle of operation.

It is believed that the operation of the riveting machine of the invention is now apparent from the foregoing description of the various machine elements. Various modifications may be made within the spirit of the invention and the scope of the appended claims.

I claim:

1. A machine for securing to a fabric or the like a preformed fastener element of the type having one or more rivet projections adapted to extend through the fabric comprising, a frame member, an anvil supported on the base of the frame, a reciprocating plunger supported on said frame for movement to and from said anvil, said anvil being arranged to receive a layer of fabric thereover, a rotatable shaft, a crank connecting said shaft and plunger to reciprocate said plunger to and from said anvil for each revolution of said shaft, a storage chute adapted to contain a plurality of serially positioned fastener elements, said storage chute having a delivery end extending in a position beneath said plunger and above said anvil, cam operated escapement means responsive to a complete reciprocation of said plunger to and from said anvil to thereafter release a single fastener element to be fed by gravity through the delivery end of said chute to a position beneath said plunger for subsequent movement with the plunger towards said anvil, a slideway adapted to contain a plurality of serially positioned rivet plate members and having a delivery end extending to said anvil, first means to feed a strip of rivet plate members through said slideway towards said anvil, second means to cut a single plate member from the strip of members as said strip is moved through said slideway towards said anvil, and third means to move a cut plate member through the delivery end of said slideway onto said anvil beneath said fabric in a position to receive the rivet projections of said fastener element as said plunger moves towards said anvil, cam and lever means interconnecting said first, second and third means with said reciprocating plunger to thereby correlate the feeding, cutting and positioning of said plate members to the movement of said plunger towards the anvil, and means reciprocable with said plunger during at least part of the plunger's movement towards the anvil to engage and guide said element in its movement towards said anvil upon reciprocation of said plunger whereby the rivet projections are caused to pierce the fabric and rivet plate, said anvil having indentations positioned to receive the rivet projections as they pierce the fabric and rivet plate to thereby upset and clinch said projections against the rivet plate.

2. The invention of claim 1 and further including a presser foot normally positioned to overlie said anvil in spaced relation, and means to move said presser foot towards said anvil in a manner to engage the upper surface of a layer of fabric overlying the anvil during the reciprocation of said plunger towards said anvil.

3. A machine for securing to a fabric or the like a preformed fastener element of the type having one or more rivet projections adapted to extend through the fabric comprising a frame member, an anvil supported on the base of the frame, a reciprocating plunger supported on said frame above said anvil, means to reciprocate said plunger to and from said anvil, said anvil being arranged to receive a layer of fabric thereover, means to position a fastener element beneath said plunger when said plunger is in a position away from said anvil, first means to feed a strip of rivet plate members towards said anvil, second means to cut a single plate member from the strip of members as said strip is moved towards said anvil, and third means to position a cut plate member on said anvil beneath said fabric in a position to receive the rivet projections of said fastener element as said plunger moves towards said anvil, cam and lever means interconnecting said first, second and third means with said reciprocating plunger to thereby correlate the feeding, cutting and positioning of said plate members to the movement of said plunger towards the anvil, and means reciprocable with said plunger during at least part of the plunger's movement towards the anvil to engage and guide said element for movement towards said anvil upon reciprocation of said plunger whereby the rivet projections are caused to pierce the fabric and rivet plate on said anvil, said anvil having indentations to engage the rivet projections as they pierce the fabric and rivet plate to thereby upset and clinch said projections against the rivet plate.

4. The invention of claim 3 for use with fastener elements of magnetic material wherein said means to engage and guide a fastener element beneath said plunger for movement towards said anvil includes a magnetic element to magnetically attract the fastener element as said plunger moves towards said anvil.

5. In a machine for securing to a fabric or the like a preformed fastener element of a type having a rivet projection adapted to extend through the fabric, the improvement comprising, a frame, an anvil supported on the frame, a reciprocating plunger supported on said frame for movement to and from said anvil, means for reciprocating said plunger to and from said anvil, means for feeding a strip of rivet plate members toward said anvil, means for cutting a single plate member from said strip of members as said strip is moved toward said anvil, means for positioning a cut plate member on said anvil in a position to receive the rivet projection of said fastener element as said plunger moves toward said anvil, and means interconnecting said strip feeding means, said cutting means and said plate member positioning means to correlate the feeding, cutting and positioning of said plate members to the movement of said plunger toward said anvil.

6. A machine for securing to a fabric or the like a preformed fastener element of a type having a rivet projection adapted to extend through the fabric comprising, a frame, an anvil supported on the frame, a reciprocating plunger supported on said frame for movement to and from said anvil, means for reciprocating said plunger to and from said anvil, means for feeding a strip of rivet plate members toward said anvil, means for cutting a single plate member from said strip of members as said strip is moved toward said anvil, means for positioning a cut plate member on said anvil in a position to receive the rivet projection of said fastener element as said plunger moves toward said anvil, means interconnecting said strip feeding means, said cutting means and said plate member positioning means to correlate the feeding, cutting and positioning of said plate members to the movement of said plunger toward said anvil, and means for positioning a fastener element beneath said plunger when said plunger is in a position away from said anvil.

7. A machine for securing to a fabric or the like a preformed fastener element of a type having a rivet projection adapted to extend through the fabric comprising, a frame, an anvil supported on the frame, a reciprocating plunger supported on said frame for movement to and from said anvil, means for reciprocating said plunger to and from said anvil, means for feeding a strip of rivet plate members toward said anvil, means for cutting a single plate member from said strip of members as said strip is moved toward said anvil, means for positioning a cut plate member on said anvil in a position to receive the rivet projection of said fastener element as said plunger moves toward said anvil, means interconnecting said strip feeding means, said cutting means and said plate member positioning means to correlate the feeding, cutting and positioning of said plate members to the movement of said plunger toward said anvil, means for positioning a fastener element beneath said plunger when said plunger is in a position away from said anvil, and means reciprocable with said plunger during at least a part of the plunger's movement toward the anvil to engage and guide said fastener element for movement toward said anvil upon reciprocation of said plunger.

8. In a machine for securing to a fabric or the like a preformed fastener element of a type having a rivet projection adapted to extend through the fabric, the improvement comprising, a frame, an anvil supported on the frame, a reciprocating plunger supported on said frame for movement to and from said anvil, means for reciprocating said plunger to and from said anvil, means for feeding a strip of rivet plate members toward said anvil, means for cutting a single plate member from said strip of members as said strip is moved toward said anvil, means for positioning a cut plate member on said anvil in a position to receive the rivet projection of said fastener element as said plunger moves toward said anvil, means interconnecting said strip feeding means, said cutting means and said plate member positioning means to correlate the feeding, cutting and positioning of said plate members to the movement of said plunger toward said anvil, means for supplying fastener elements, and escapement means operable in timed relation to the reciprocation of said plunger to release a single fastener element from said supply to thereby position a single fastener element beneath said plunger for subsequent movement with said plunger toward said anvil.

9. In a machine for securing to a fabric or the like a preformed fastener element of a type having a rivet projection adapted to extend through the fabric, the improvement comprising, a frame, an anvil supported on the frame, a reciprocating plunger supported on said frame for movement to and from said anvil, means for feeding a strip of rivet plate members toward said anvil, means for cutting a single plate member from said strip of members as said strip is moved toward said anvil, means for positioning a cut plate member on said anvil in a position to receive the rivet projection of said fastener element as said plunger moves toward said anvil, means interconnecting said strip feeding means, said cutting means and said plate member positioning means to correlate the feeding, cutting and positioning of said plate members to the movement of said plunger toward said anvil, a storage chute adapted to contain a plurality of individual fastener elements, said storage chute having a delivery end extending in a position beneath said plunger and above said anvil, escapement means responsive to a complete reciprocation of said plunger to release a single fastener element to be fed by gravity through the delivery end of said chute to a position beneath said plunger for subsequent movement with the plunger toward said anvil.

10. A machine for securing to a fabric or the like a preformed fastener element of magnetic material of the type having one or more rivet projections adapted to extend through the fabric comprising, a frame member, an anvil supported on the base of the frame, a reciprocating plunger supported on said frame for movement to and from said anvil, said anvil being arranged to receive a layer of fabric thereover, a rotatable shaft, a crank connecting said shaft and plunger to reciprocate said plunger to and from said anvil for each revolution of said shaft, first means to feed a strip of rivet plate members towards said anvil, second means to cut a single plate member from the strip of members as said strip is moved towards said anvil, and third means to position a cut plate member on said anvil in a position to receive the rivet projections of said fastener element as said plunger moves towards said anvil, cam and lever means interconnecting said first, second and third means with said reciprocating plunger to thereby correlate the feeding, cutting and positioning of said plate members to the movement of said plunger towards the anvil, and magnetic means on the end of said plunger to attract and guide said element in its movement towards said anvil upon reciprocation of said plunger whereby the rivet projections are caused to pierce the fabric and rivet plate, said anvil having indentations positioned to receive the rivet projections as they pierce the fabric to thereby upset and clinch said projections against the rivet plate.

References Cited in the file of this patent

UNITED STATES PATENTS

| | | |
|---|---|---|
| 469,891 | Arnold | Mar. 1, 1892 |
| 692,757 | Barber | Feb. 4, 1902 |
| 965,252 | Swift | July 26, 1910 |
| 1,184,073 | Choate | May 23, 1916 |
| 1,207,964 | Mahler | Dec. 12, 1916 |
| 1,373,462 | Stuart | Apr. 5, 1921 |
| 2,273,893 | Richard | Feb. 24, 1942 |
| 2,624,879 | Baird | Jan. 13, 1953 |